Patented Dec. 30, 1930

1,786,800

UNITED STATES PATENT OFFICE

JUSTIN F. WAIT, OF NEW YORK, N. Y., ASSIGNOR TO NATIONAL ANILINE & CHEMICAL CO., INC., A CORPORATION OF NEW YORK

METHOD OF PRODUCING INDIGO BY ARYLGLYCINE FUSION

No Drawing.   Application filed December 18, 1924.   Serial No. 756,797.

This invention relates to a process of manufacturing indigo and the product thereby obtained. It relates more particularly to a method by which indigo is produced in a certain condition suitable for handling and shipment.

In prior methods of manufacturing indigo paste, indoxyl is oxidized by air in an alkaline solution whereupon indigo is precipitated and is usually separated from the alkaline mass by filtration as, for example, by using a plate and frame type of filter. In this manner the indigo cake, containing about 25% to 30% of indigo, and with the remainder mainly water having an appreciable alkaline content, is obtained. It has been customary to wash this alkaline paste with dilute acid such as sulfuric acid, for example, in order to overcome this alkalinity or even to render the same slightly acid. The neutral or slightly acid indigo paste is diluted with water so as to obtain a 20% indigo paste. In case it is desired to ship the indigo long distances, slightly more water may be added to compensate for evaporation.

It has been found that a paste composed of 20% indigo and the remainder water is suitable for the trade as its viscosity is sufficient to give it body and a paste-like appearance. It has also been considered that the acid condition of the paste is advantageous in increasing the viscosity and in improving the keeping qualities of the paste. The acid treatment of the paste has been recommended and used for removal of iron impurities and for elimination of or at least decreasing the organic impurities which were acid soluble.

In other processes of manufacture the indigo has been thoroughly dried so as to leave less than 10% of moisture, this product then being treated chemically to effect purification and again dried, ground to powder, and shipped in this condition. By the present process it has been found possible to keep the impurities below an objectionable amount without the necessity of an acid treatment. The concentrated paste may be dried in a slightly alkaline or neutral condition, ground, standardized and shipped.

In carrying out this invention a compound capable of producing a product that can be oxidized in an alkaline solution to produce indigo, is fused with caustic alkali and the fused mass is dissolved in water. The solution is treated to remove insoluble materials and is then air oxidized in the usual way to precipitate indigo. The indigo is then separated by filtration or in any other convenient way. An indigo paste can thus be produced having properties different from prior indigo pastes. By producing a paste in this way and permitting it to remain alkaline, the expense and yield losses entailed by resludging with acid and refiltering is avoided. The paste may, if desired, be washed with water or very dilute acid so as to decrease the alkalinity of the paste to below 0.05% based upon the OH content. The alkalinity of 0.05% has been found to be desirable for commercial purposes but the invention is not restricted to this particular degree of alkalinity. In applying indigo for dyeing purposes an alkaline bath is sometimes used—the presence of an alkali in the paste thus facilitates the preparation of the bath. By maintaining an alkaline condition rather than the usual acid condition, it is possible to use metallic containers for the shipment and for handling of indigo paste, previous custom involving the use of wooden barrels or kegs. In some cases it may be desirable to decrease the alkalinity to zero or even to make the paste slightly acid, say up to 1%.

It has been found that by proper control of the process and the use of suitable equipment such as rotary filters, a paste having an indigo content above 35% can be produced. A product composed of 40% of indigo has been found to be very desirable for commercial purposes and can be produced by this process. When the indigo content of the product is increased from 20% to 40%, the gross weight of material to be shipped to get the same amount of indigo is decreased 50% thus saving in handling, packaging and transportation costs.

The following is given as a specific example to illustrate how the process can be carried out. About 8 parts by weight of a potassium salt of phenylglycine is fused with about 50 parts by weight of a eutectic i. e., equimolecular, mixture of sodium and potassium hydroxides and about 5 parts by weight of sodamide at a temperature of over 200° C. The mixture is then diluted with sufficient water to give a 10% solution of caustic alkali and is permitted to settle. The undissolved materials are removed and the solution is air oxidized at about 85° C. until precipitation of indigo is completed. The indigo is then removed as, for example, by means of a filter press and may be washed with water or very dilute acid until the desired state of alkalinity or acidity is reached. The caustic liquor is concentrated and rendered fit for reuse. It is concentrated until it contains less than 10% of moisture and the molten mass is treated to remove materials that are solid above 230° C. such as iron oxide, for example, that may have been derived from equipment by corrosion. The concentrated dehydrated caustic may be again used for fusion purposes. If desired, sodamide may be added to insure dehydration and to assist in the desired chemical reaction.

Where, in the specification and claims, the alkalinity is spoken of as being a certain value, for example 0.05%, "based upon the OH content," it is intended to mean that the content of alkaline reacting substances, as shown by titration, calculated in terms of hydroxyl ions is equal to that value, for example 0.05%, of hydroxyl ions.

I claim:

1. In the process of producing indigo, the steps which comprise fusing the potassium salt of phenylglycine with a mixture containing potassium and sodium hydroxides and sodamide, dissolving the fusion mass in sufficient water to form a dilute caustic alkali solution, precipitating indigo, separating caustic alkali liquor from said indigo, concentrating said liquor to a water content of less than 10 per cent., removing material that remains solid above 230° C. from said liquor, and fusing the resulting concentrated caustic alkali with sodamide and the potassium salt of phenylglycine.

2. In the process of producing indigo, the steps which comprise fusing the potassium salt of phenylglycine with a mixture of sodamide and potassium and sodium hydroxides, dissolving the fusion mass in sufficient water to form a 10 per cent. solution of caustic alkali, passing air into the resulting mixture to precipitate indigo, separating caustic alkali liquor from said indigo, concentrating said liquor to a water content of less than 10 per cent., removing material that remains solid above 230° C. from said liquor, and fusing the resulting concentrated caustic alkali with sodamide and the potassium salt of phenylglycine.

In testimony whereof I affix my signature.

JUSTIN F. WAIT.